US009211889B1

(12) United States Patent
Hoetzer et al.

(10) Patent No.: US 9,211,889 B1
(45) Date of Patent: Dec. 15, 2015

(54) ENHANCED BLIND SPOT DETECTION FOR VEHICLE WITH TRAILER (71) Applicant: Robert Bosch GmbH, Stuttgart (DE)

(72) Inventors: Dieter Hoetzer, Markgroeningen (DE); Maria Eugenia Garcia Bordes, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/445,430

(22) Filed: Jul. 29, 2014

(51) Int. Cl.
*G08B 21/00* (2006.01)
*B60W 30/08* (2012.01)
*B60Q 9/00* (2006.01)
(Continued)

(52) U.S. Cl.
CPC .................. *B60W 30/08* (2013.01); *B60Q 1/00* (2013.01); *B60Q 5/006* (2013.01); *B60Q 9/008* (2013.01); *G01S 13/931* (2013.01); *G01S 15/931* (2013.01); *G01S 17/936* (2013.01); *G08G 1/167* (2013.01); *G01S 2013/9332* (2013.01)

(58) Field of Classification Search
CPC ......... B60W 30/08; B60Q 1/00; B60Q 5/006; B60Q 9/008; G01S 17/936; G01S 13/931; G01S 15/931; G01S 2013/9332; G08G 1/167
USPC .............. 340/431, 435, 436, 903, 901, 425.5, 340/933, 937, 438, 439, 904, 555, 557; 180/167, 169; 367/99, 107, 907; 701/41, 301
See application file for complete search history.

(56) References Cited

U.S. PATENT DOCUMENTS 7,501,938 B2   3/2009   Widmann et al.
7,904,222 B2   3/2011   Lee et al.
(Continued)

FOREIGN PATENT DOCUMENTS

DE   102011082475 A1   3/2013
DE   102012017668 A1   3/2014
(Continued)

OTHER PUBLICATIONS

Integrated Vehicle-Based Safety Systems, First Annual Report, U.S. Department of Transportation, Oct. 2007.
(Continued)

*Primary Examiner* — Anh V La
(74) *Attorney, Agent, or Firm* — Michael Best & Friedrich LLP (57) ABSTRACT

A driver assistance method and system senses the presence of a trailer secured to a host vehicle and provides an indication thereof. When a yaw rate for the vehicle exceeds a predetermined value during turning of the host vehicle, the system determines the length of the trailer. To determine trailer length, reflection points from an output of a rear sensor unit are sensed to detect a side wall of the trailer. The farthest reflection point of the trailer is utilized to determine a longitudinal distance and a transverse distance of the trailer with respect to the reflection sensor. The longitudinal distance corresponds to a longitudinal axis of the host vehicle and the transverse axis is transverse to the longitudinal axis. The trailer length is estimated from the yaw rate that provides a trailer angle relative to the host vehicle, and the longitudinal and transverse distances. From the trailer length, the system provides combined blind spot detection zones adjacent the host vehicle, and adjacent to the side of and extending beyond the rear of the trailer. The system also provides lane change assistance.

19 Claims, 9 Drawing Sheets (51) Int. Cl.
*B60Q 5/00* (2006.01)
*B60Q 1/00* (2006.01)
*G01S 13/93* (2006.01)
*G01S 17/93* (2006.01)
*G01S 15/93* (2006.01)
*G08G 1/16* (2006.01)

(56) References Cited

U.S. PATENT DOCUMENTS

| | | | |
|---|---|---|---|
| 8,576,115 | B2 | 11/2013 | Basten |
| 8,665,078 | B2 * | 3/2014 | Van Wiemeersch et al. . 340/431 |
| 2006/0261936 | A1 | 11/2006 | Widmann et al. |
| 2008/0186204 | A1 | 8/2008 | Buckley |
| 2009/0005932 | A1 | 1/2009 | Lee et al. |
| 2013/0169425 | A1 | 7/2013 | Victor et al. |
| 2014/0085472 | A1 | 3/2014 | Lu et al. |
| 2014/0172239 | A1 * | 6/2014 | Vergara et al. .......... 701/49 |
| 2014/0176716 | A1 * | 6/2014 | Wallat et al. .......... 348/148 |

FOREIGN PATENT DOCUMENTS

| | | |
|---|---|---|
| WO | 2010064963 | 6/2010 |
| WO | 2014070047 A1 | 5/2014 |

OTHER PUBLICATIONS

Robert Bosch GmbH, PCT/EP2015/064675 International Search Report dated Aug. 10, 2015 (11 pages).

* cited by examiner

ENHANCED BLIND SPOT DETECTION FOR VEHICLE WITH TRAILER

BACKGROUND

The present invention relates to vehicle monitoring systems and. In particular, systems and methods described herein relate to blind spot detection (BSD) technologies.

SUMMARY

In one embodiment, the invention provides a vehicle blind spot detection system for host vehicles with attached trailers comprising: at least two vehicle object rear sensor units located at a rear of a host vehicle, the sensor units disposed at opposing edges of the rear for detecting data regarding presence and location of objects relative to the host vehicle and motion information including moving direction and speed of objects relative to the host vehicle; and at least one electronic control unit in communication with one or both of the rear sensor units for processing the data acquired by the rear sensor units, wherein the electronic control unit is configured to: receive the data acquired by one or both of the rear sensor units, the acquired data including presence and location of objects with respect to a longitudinal axis and a transverse axis of the host vehicle, and the motion information from the rear sensor units; determine presence of a trailer when the motion information and the detected objects indicate the presence of a trailer attached to the rear of the host vehicle when the host vehicle and the trailer have same velocity; determine a length of the trailer when the presence of the trailer is indicated and the host vehicle is turning; provide an enhanced blind spot detection zone adjacent side walls of the trailer and extending rearward from the trailer an additional distance in response to the determined presence and the length of the trailer attached to the host vehicle, the host vehicle having a host vehicle blind spot detection zone to provide, in combination with the enhanced blind spot detection zone, a combined blind spot detection zone for the host vehicle and the trailer; and execute a blind spot detection to determine the presence of an object in the combined blind spot detection zone.

In one embodiment, a human/machine display interface notifies a vehicle operator whether changing a lane is available in response to the determination of the presence of an object in the combined blind spot detection zone of the host vehicle and the trailer.

In another embodiment, the electronic control unit is configured to automatically determine the length of an attached trailer by: sensing a distance and direction of a farthest reflection point of the trailer during turning of the host vehicle, the farthest reflection point being determined based on host vehicle velocity essentially matching a velocity from the reflection point and a reflection path of a signal transmitted by one of the rear sensor units to the farthest reflection point that has a farthest distance from the one rear sensor unit, the reflection path defining a longitudinal distance dx and a transverse distance dy for the farthest reflection point from the sensor unit, and wherein a plurality of reflection points define a side wall that includes the farthest reflection point of the trailer in the field-of-view of the rear sensor unit, and receiving a yaw rate from the electronic stability control, and when the yaw rate is greater than a predetermined yaw rate value, determining a trailer angle for the trailer based on the yaw rate, the trailer angle being relative to a longitudinal axis of the host vehicle, and executing a Pythagorean theorem to estimate trailer length based on distances dx, dy of the farthest reflection point and the trailer angle.

In one embodiment, the system includes an electronic control unit that is configured to automatically detect the presence, location and motion of any object within a field of view of the at least two vehicle object rear sensor units, and is configured to sense vehicles driving on neighboring lanes or vehicles following the host vehicle.

In another embodiment, the enhanced blind spot detection zone extends at least two meters beyond a rear of the trailer attached to the host vehicle and the human-machine interface includes a warning unit for providing a vehicle operator with at least one warning selected from a group of: optical, acoustical and haptic warnings.

In one embodiment, the electronic control unit is configured for deactivation by a vehicle operator at any time by actuation of an input of the human/machine display interface, and the human/machine display interface is capable of receiving a manually input trailer length value, the manual input the trailer length value overriding the length of the trailer determined by the electronic control unit.

In another embodiment, the rear sensor units comprise at least one selected from a group of: radar units, video camera units, LIDAR units and ultrasonic units.

In another embodiment, the invention provides a method for providing vehicle blind spot detection for host vehicles with trailers comprising: obtaining data regarding location and presence of objects relative to a host vehicle and motion information including moving direction and speed of the objects relative to the host vehicle from at least one rear sensor unit; processing the data acquired, including the detection of objects and their location and presence with respect to a longitudinal axis and a transverse axis of the host vehicle and motion information including moving direction and speed of objects; determining presence of a trailer attached to the host vehicle when the motion information indicates that the detected object and the host vehicle have essentially the same speed and direction, while the location of the object is within a predetermined distance from the rear of the host vehicle; determining a length of the trailer when the presence of the trailer is indicated and the host vehicle is turning; determining the presence of an object in a combined blind spot detection zone of the host vehicle, wherein the combined blind spot detection zone comprises a blind spot detection zone of the host vehicle and an enhanced blind spot detection zone of the trailer that depends on the length of the trailer and extends rearward from the trailer a predetermined additional distance; and when a turn signal is actuated, notifying a vehicle operator when changing a lane whether a vehicle is in the intended lane.

In another embodiment, the invention provides a method for providing vehicle blind spot detection for host vehicles with trailers comprising: obtaining data regarding location and presence of objects relative to a host vehicle, and motion information including moving direction and speed of the objects relative to the host vehicle from at least one rear sensor unit; processing the data acquired, including the detection of objects and their location with respect to a longitudinal axis and a transverse axis of the host vehicle and motion information including moving direction and speed of objects; determining presence of a trailer with the motion information indicating that the detected object and the host vehicle have essentially the same speed and direction, while the location of the object is within a predetermined distance of the host vehicle; determining a length of the trailer when the presence of the trailer is indicated by sensing a farthest reflection point of the trailer from sensing a distance and a direction of the trailer from one of the rear sensor units, the farthest reflection point being determined based on host vehicle velocity essentially matching trailer velocity and a reflection path of a signal transmitted by the one rear sensor unit to the farthest reflection point having a farthest distance from the one rear sensor unit, and wherein a plurality of reflection points define a side wall that includes the farthest reflection point of the trailer in the field-of-view of the sensor unit; and receiving a yaw rate from the electronic stability control, and when the yaw rate is greater than a predetermined yaw rate value, determining a trailer angle for the trailer based on the yaw rate and the farthest reflection point, the trailer angle being relative to a longitudinal axis of the host vehicle; determining an enhanced blind spot detection zone based on the length of the trailer, the enhanced blind spot detection zone extending rearward of a rear of the trailer a predetermined distance; and detecting presence of an object in a combined blind spot detection zone of the host vehicle, wherein the combined blind spot detection zone comprises a blind spot detection zone of the host vehicle and the enhanced blind spot detection zone of the trailer.

In another embodiment, the farthest reflection point has a greatest value for longitudinal distance dx.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
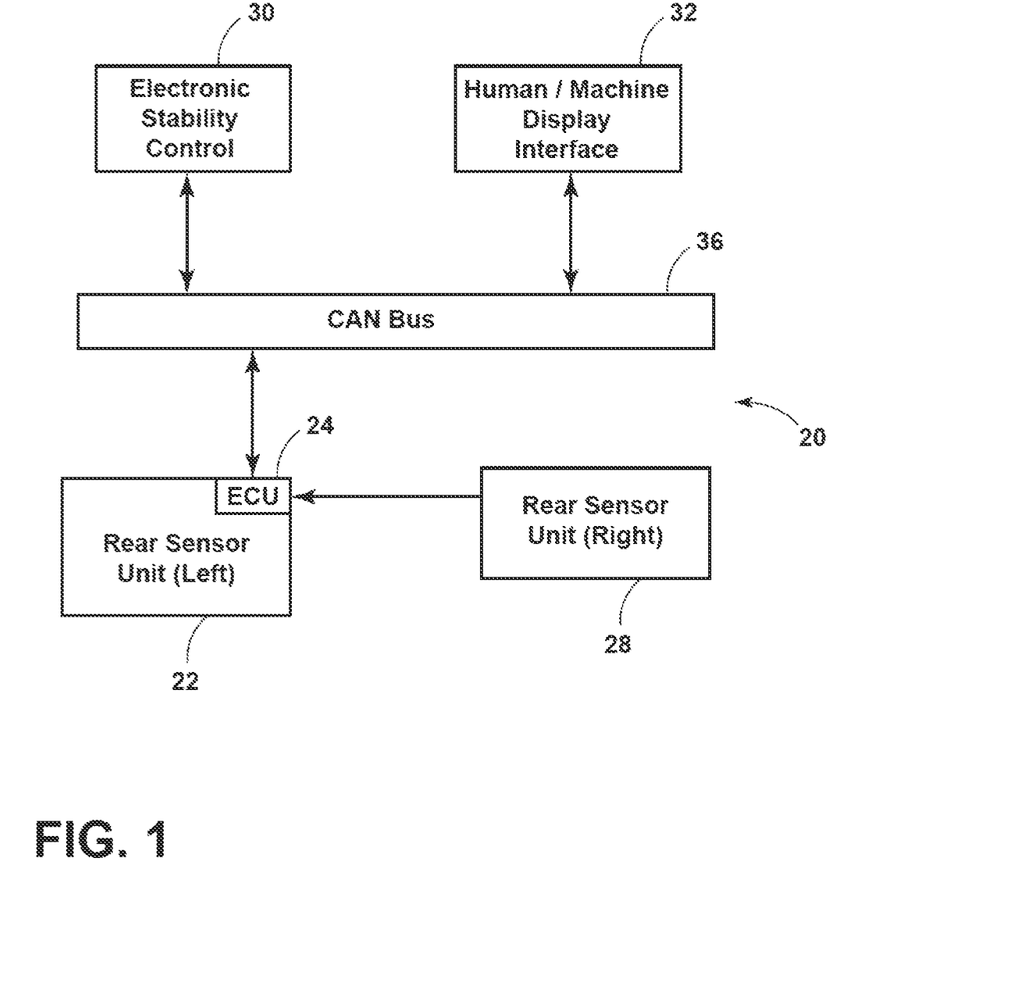
FIG. 1 is a block diagram of a vehicle blind spot detection system according to one embodiment.

FIG. 1 illustrates a driver's assistance system 20 for a host vehicle such as a four-wheeled car or truck. The system 20 includes a vehicle object left rear sensor unit 22 having an electronic control unit (ECU) 24 and a vehicle object right rear sensor unit 28. The right rear sensor unit 28 connects to the left rear sensor unit 22 in a master-slave arrangement. Further, the system includes an electronic stability control unit (ESC) 30 and a human/machine interface, preferably provided as a human/machine display interface 32. The display interface 32 receives manual inputs from a user. A CAN bus 36 provides communication between the rear sensor unit 22, the ESC 30 and the human/machine display interface 32.

The ECU 24 is provided to receive inputs from the left rear sensor unit 22 and the right rear sensor unit 28 and communicate over the CAN bus 36. Various other vehicle subsystems also connect to the CAN bus 36 and communicate with each other.

Figure 2:
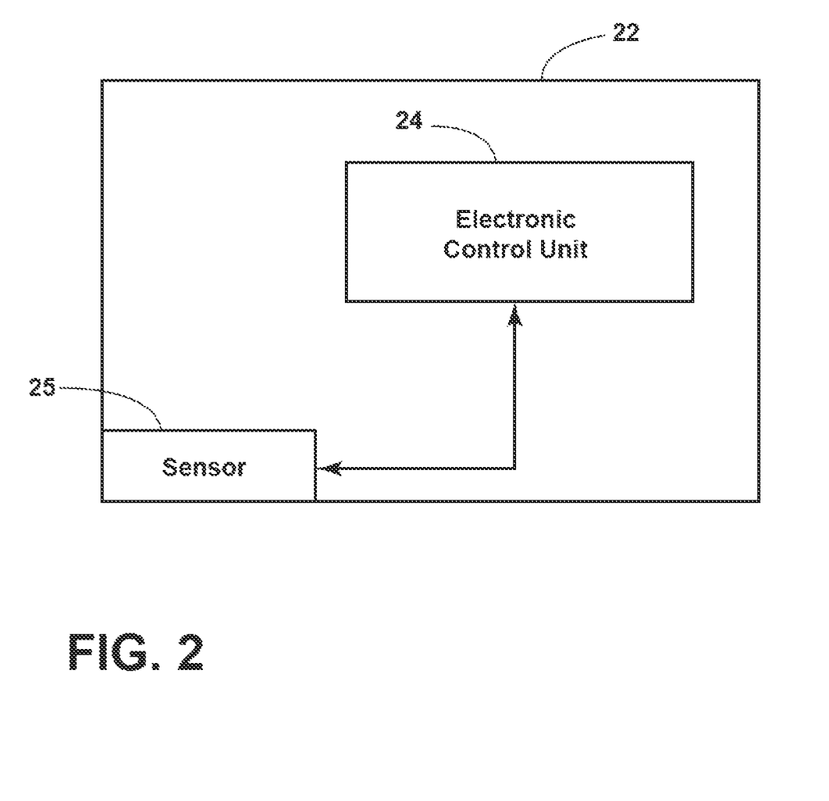
FIG. 2 is a block diagram of a sensor unit.

FIG. 2 is a block diagram of an individual rear sensor unit 22, 28. The rear sensor unit illustrated in FIG. 2 is labeled as the left rear sensor unit 22. However, in some embodiments, the right rear sensor unit 28 includes similar components. The rear sensor unit 22 includes the electronic control unit 24 and a sensor 25. In some embodiments, the rear sensor units 22, 28 mount onto a rear vehicle bumper below respective rear brake lights. In other embodiments, the sensor units 22, 28 are adjacent the rear brake lights.

In some constructions, the electronic control unit 24 includes a processor that has an executable program stored in a memory module, such as a ROM. The ECU 24 also includes a RAM for storing information from other vehicle units that is received through the CAN bus 36. Non-transitory computer readable memory modules of the ECU 24 include volatile memory, non-volatile memory, or a combination thereof and, in various constructions, may also store operating system software, applications/instructions data, and combinations thereof.

The sensor 25 in the example of FIG. 2 includes a radar sensor. Each radar sensor senses a direction, distance and measures a speed of a closing object to determine that the object is closing in distance to the host vehicle. The speed of the closing object is adjusted by the speed of the host vehicle supporting the radar sensors 25. In other constructions, the sensor 25 may include other sensor technologies including, for example, a light detecting and ranging (LIDAR) sensor, an ultrasonic sensor or a video camera. In some embodiments, multiple sensors of different types are provided in the sensor units 22, 28 or in separate additional sensor units disposed at different locations of the host vehicle.

Figure 3:
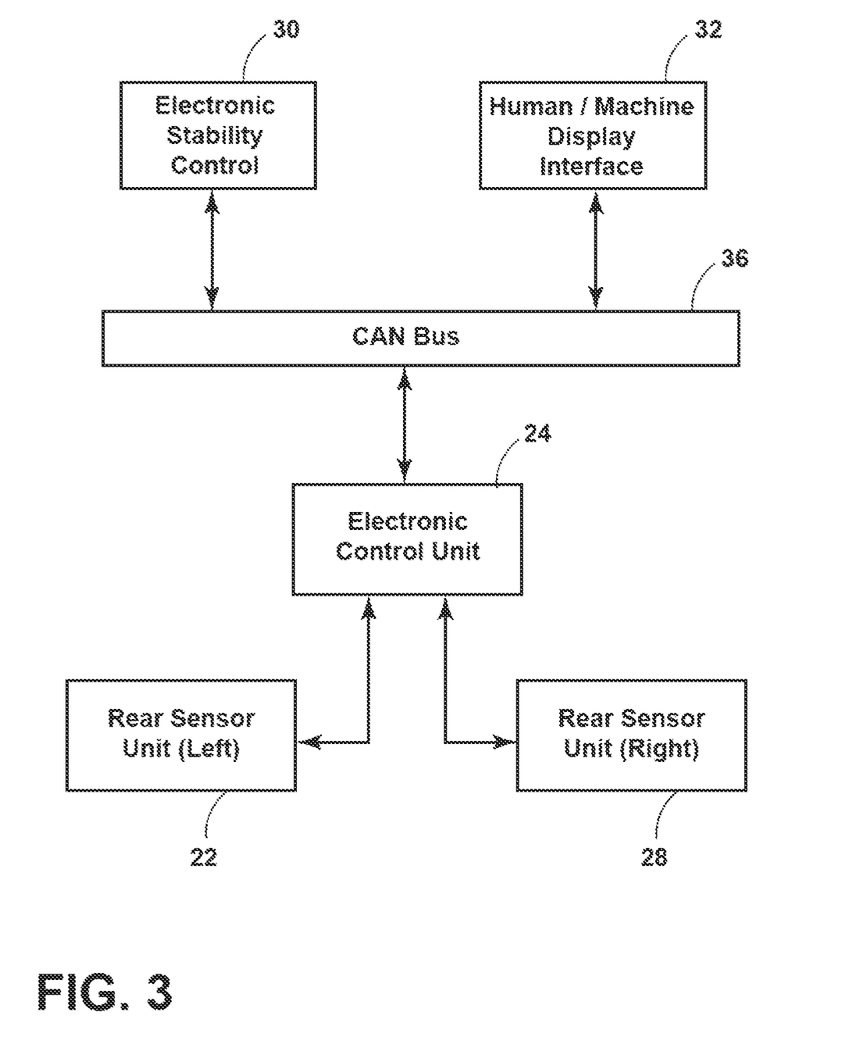
FIG. 3 is a block diagram of a vehicle blind spot detection system according to a second embodiment.

FIG. 3 shows the left rear sensor unit 22 having the electronic control unit 24 separate therefrom and both the left rear sensor unit 22 and the right rear sensor unit 28 providing inputs to the electronic control unit 24. The embodiment operates in a similar manner to the embodiment of FIG. 1.

Figure 4:
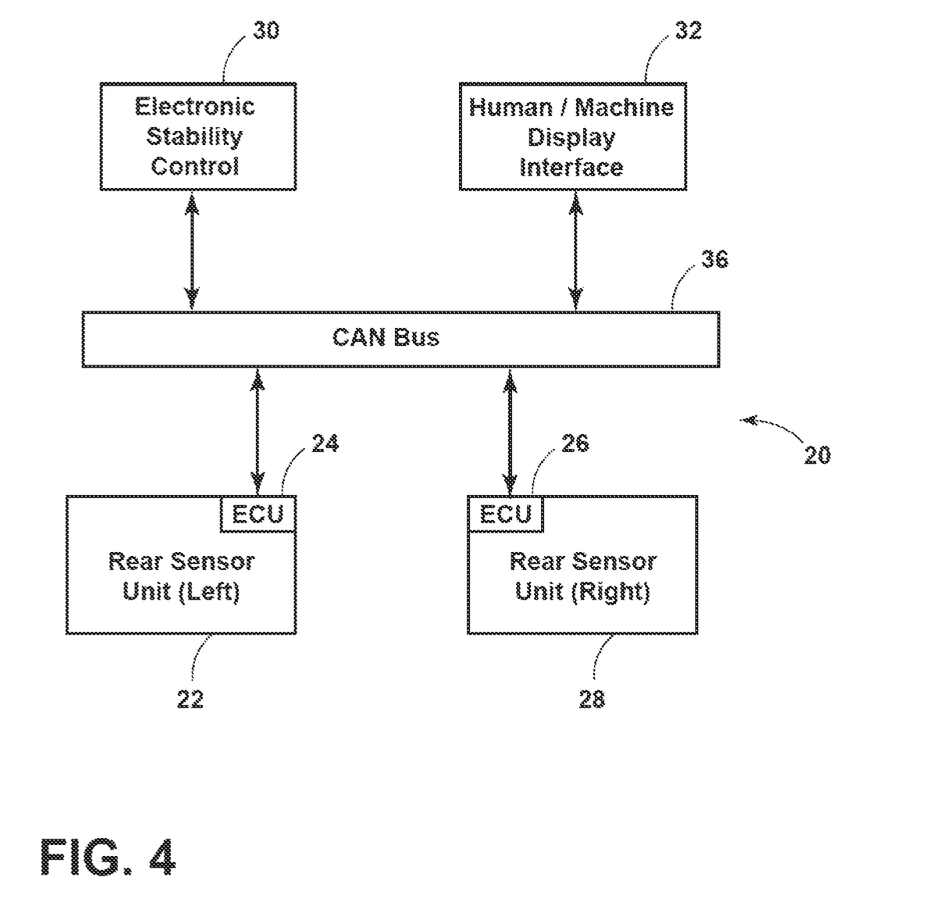
FIG. 4 is a block diagram of a vehicle blind spot detection system according to a third embodiment.

The embodiment shown in FIG. 4 is similar to the embodiment shown in FIG. 3 having an ECU 24 connecting the left rear sensor unit 22 to the CAN bus 36, except an ECU 26 associated with the right rear sensor unit 28 also communicates over the CAN bus 36.

Figure 5:
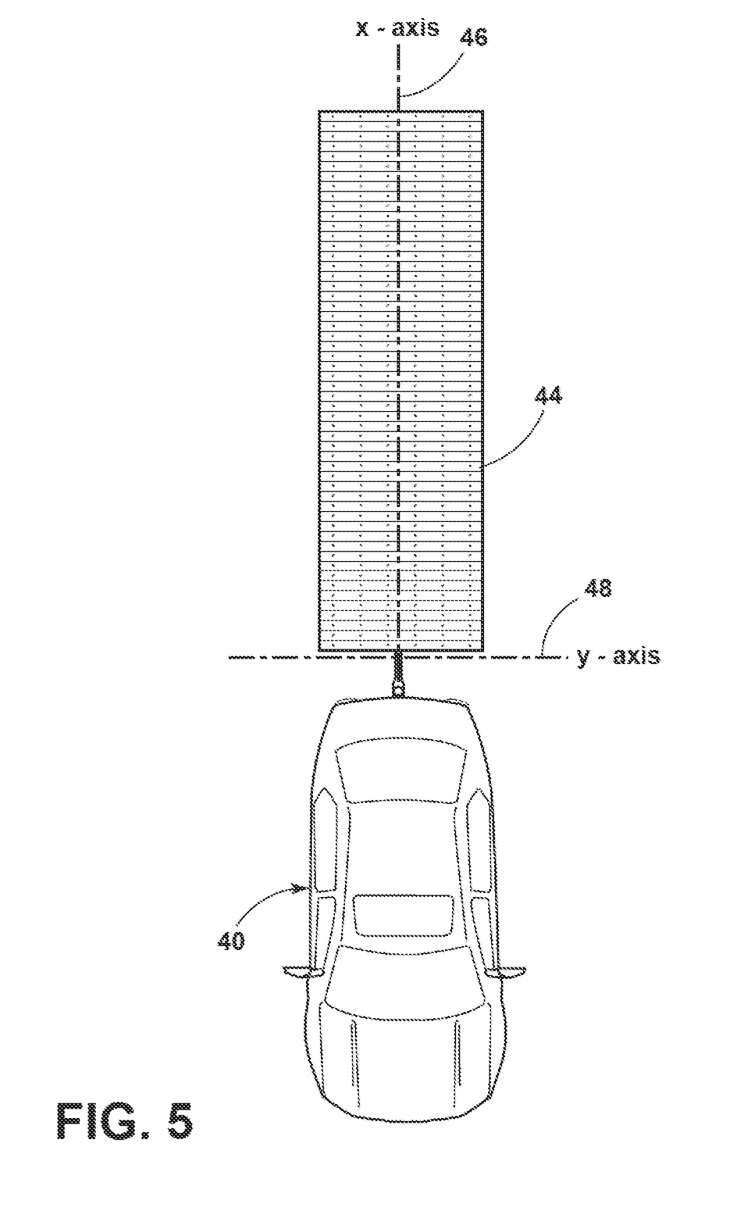
FIG. 5 is a top view of a host vehicle and a trailer.

FIG. 5 shows a host vehicle 40 with a trailer 44 hitched or otherwise pivotably joined thereto. As the host vehicle 40 and trailer 44 are in alignment, a longitudinal or X axis 46 extends through the host vehicle 40 and the trailer 44. A transverse or Y axis 48 extends perpendicular or transverse to the longitudinal axis 46.

Trailer Presence Determination

Figure 6:
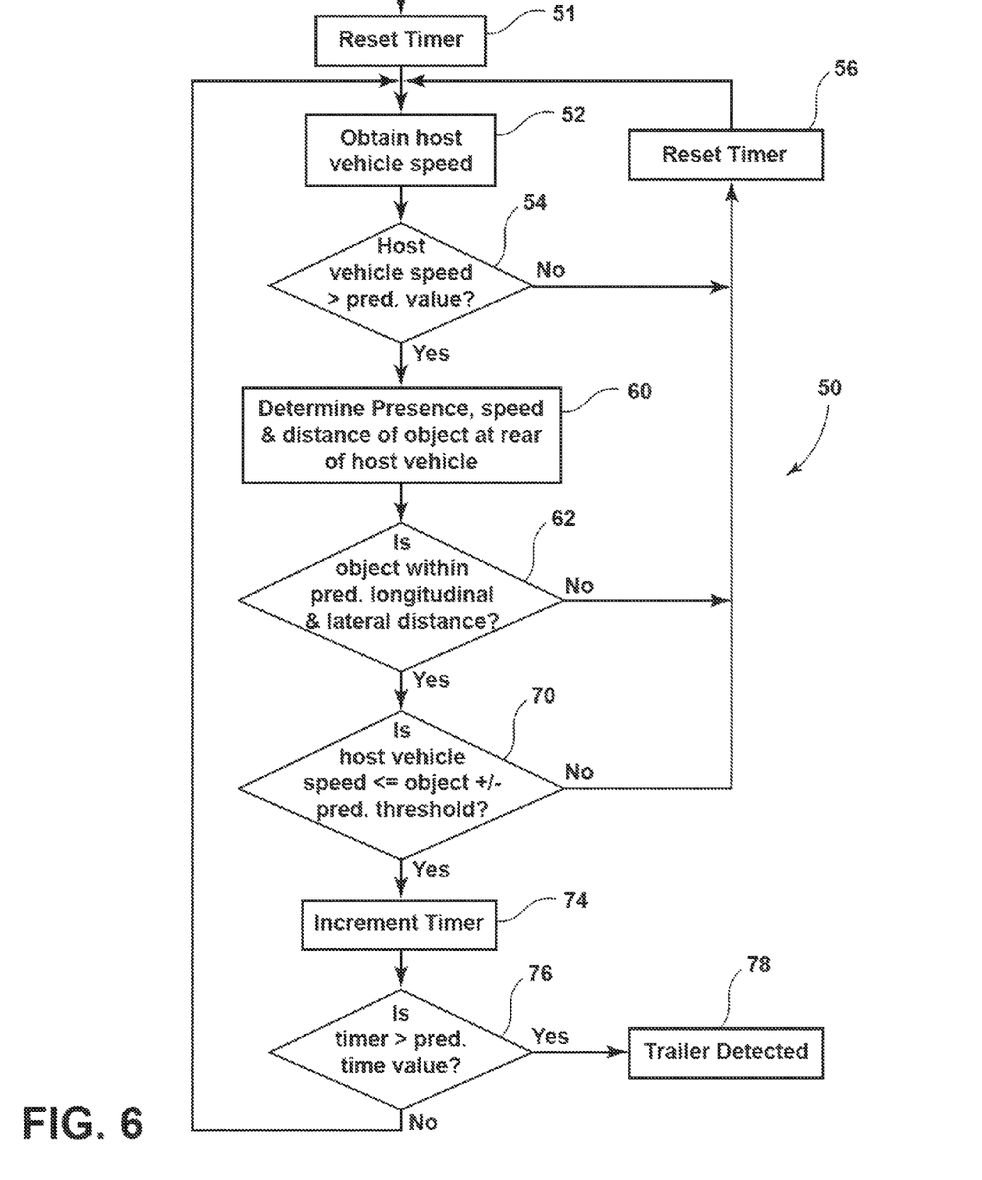
FIG. 6 is a flowchart of a method for determining the presence of a trailer.

FIG. 6 is a flowchart 50 illustrating one method in which a sensor unit 22, 28 of the vehicle blind spot detection system 20 of FIG. 1 monitors for the presence of a trailer 44 attached to the host vehicle 40. An ECU performs a program to determine the presence of a trailer 44. In one embodiment, each of the rear sensor units 22, 28 includes an ECU and operates independently of the other rear sensor unit. In another embodiment, one ECU receives inputs from each of the sensor units to determine the presence of a trailer 44. In another embodiment, the ECU determining the trailer presence is provided in one of the other devices, such as the ESC, that communicate through the CAN bus 36. The steps shown in FIG. 6 are for purposes of illustration, and thus the order of the steps can be changed in many instances while having no effect on execution by the ECU.

At step 51, a timer is reset to ensure that the timer is ready to begin the trailer presence determination process and the ECU advances to step 52. At step 52, the speed of the host vehicle is determined by the electronic stability control 30 or a different device provided on the host vehicle 40. The speed value is provided via the CAN bus 36 to the ECU that determines the presence of the trailer.

At step 54, the ECU determines if the host vehicle speed is greater than a predetermined value. If not, the ECU advances to step 56. At step 56 a timer is cleared or reset and the ECU returns to step 52. If the host vehicle speed is greater than the predetermined value, the ECU advances to step 60. Thus, the host vehicle cannot detect the presence of a trailer when parked next to another vehicle or other object.

At step 60, the sensor units 22, 28 determine the presence, velocity and the distance of an object from the rear of the host vehicle 40. The data is provided to the ECU. At step 62, the ECU determines whether an object is detected within longitudinal and lateral predetermined distances defining a predetermined trailer zone. In some embodiments the predetermined trailer zone is within two meters of the vehicle. If no object is detected or the object is not within the predetermined zone, the ECU advances to step 56. At step 56, a timer value is cleared or reset. Then, the ECU returns to step 52 to re-execute the steps.

When an object is detected with the predetermined zone at step 62, the ECU advances to step 70. At step 70, the ECU determines whether the speed of the host vehicle is within a predetermined threshold of the speed of the object. In some embodiments, the predetermined threshold is about 3% of the host vehicle speed. Thus, the speed of the object must be within the threshold that defines a range of 3% greater or less than the host vehicle speed. If not the speed of the object is not within the range or threshold, the ECU advances to step 56 and resets the timer. Then the ECU returns to restart at step 52. When the relative speed of the host vehicle 40 and the object is the same, the ECU advances to step 74.

At step 74, the timer is incremented and the ECU advances to step 76. At step 76, the incremented timer value is compared with a predetermined time value. If the timer value is not greater than the predetermined time value, the ECU returns to step 52 and re-executes the steps without resetting the timer. So long as an object is detected, the ECU will again advance through the steps including incrementing the timer at step 74. When at subsequent execution of step 76 the timer value is greater than the predetermined time value, the ECU advances to step 78 and indicates that a trailer 44 is hitched or attached to the host vehicle 40. Upon this detection, the ECU does not execute the routine shown in FIG. 6. Periodically, or upon a shut off and restart of the vehicle engine, the ECU repeats the steps shown in FIG. 6 to ensure that a trailer 44 remains hitched to the host vehicle 40. After determining the presence of a trailer 44, the ECU advances to a routine for determining trailer length.

Trailer Length Determination

Figure 7:
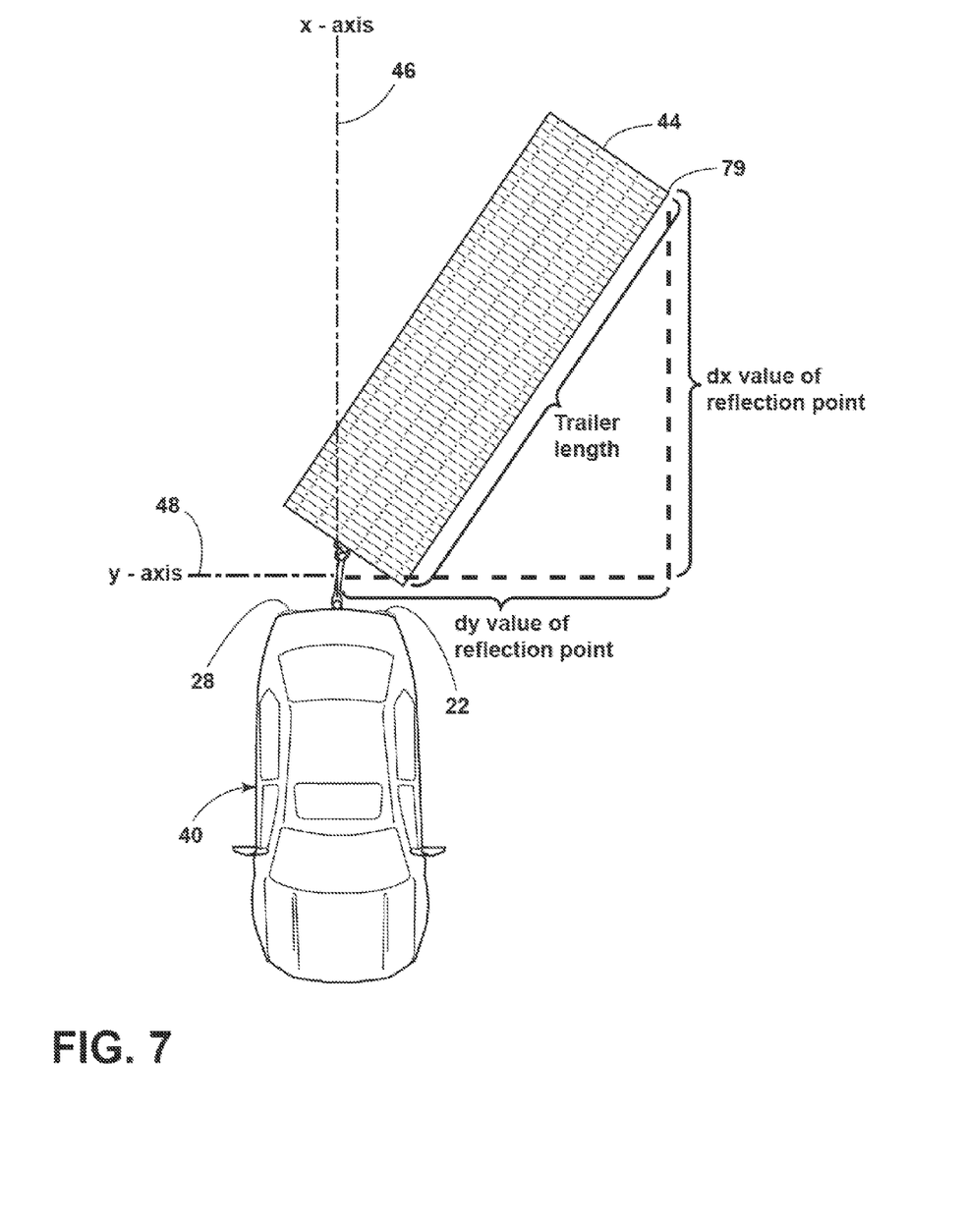
FIG. 7 is a top view of a host vehicle and a trailer during a vehicle turning operation.

FIG. 7 shows turning of the host vehicle 40 causing a change in the alignment of the trailer 44 with respect thereto. As in FIG. 5, a longitudinal or x-axis 46 with respect to the host vehicle 40 is shown extending rearwardly therefrom. Likewise, a transverse or y-axis 48 that is transverse to the longitudinal axis is shown in FIG. 7. The trailer 44 in FIG. 7 is oriented at an angle relative to the host vehicle 40 such that radar waves from the left rear sensor 22 are reflected by the side wall of the trailer. However, when the host vehicle 40 is turning rightwardly, detection is performed by the sensor unit 28. Determination of the position of the farthest reflection point that corresponds to a side wall of the trailer 44 is desired. The farthest reflection point 79 shown in FIG. 7 is obtained from a reflection of a radar wave or other detection disclosed above.

In operation, the ECU estimates trailer length as the host vehicle 40 travels in a curve with a certain minimum radius. Based on the yaw rate value of the host vehicle 40, the alignment angle of the trailer 44 relative to the host vehicle, as shown in FIG. 7, is determined. The correspondence of a reflection point and the trailer is determined based on a comparison of host vehicle velocity and the velocity of the reflection point detected. If the velocity of the host vehicle and the velocity of the reflection are the same or differ less than a certain threshold (e.g. 0.5 msec) during a certain period of time (for example five seconds while driving in a curve), the reflection point will be considered as a reflection point that belongs to the trailer. Adjacent reflection points also are sensed to determine the presence of a side wall of the trailer and to thus define the reflection point 79 at the farthest edge thereof.

Figure 8:
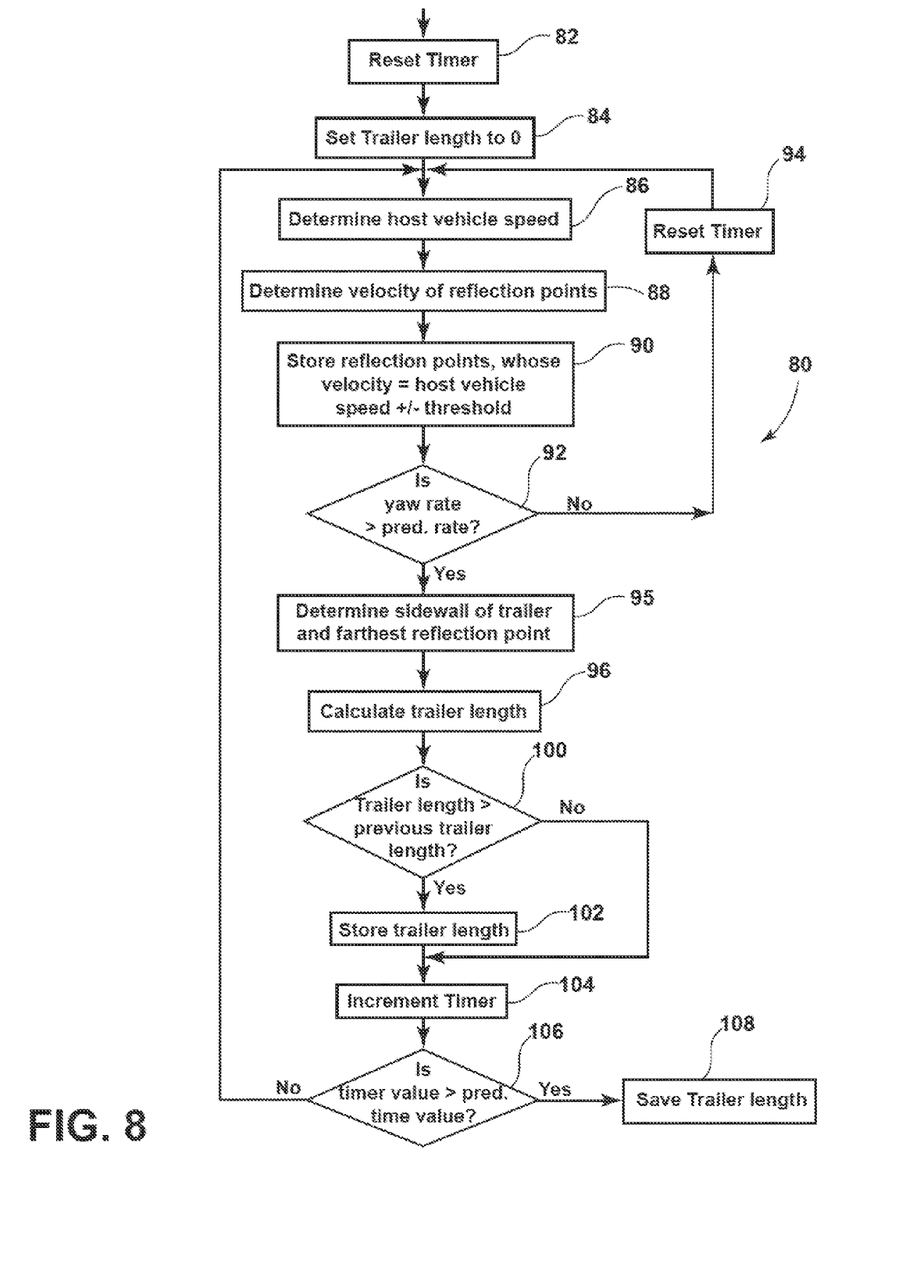
FIG. 8 is a flowchart of a method for determining the length of a trailer connected to a host vehicle.

More specifically, FIG. 8 is a flowchart 80 illustrating one method in which the sensor unit 22 of the vehicle blind spot detection system 20 of FIG. 1 determines a longitudinal distance of a trailer 44 attached to the host vehicle 40. The steps shown in FIG. 8 are for purposes of illustration, and thus the order of the steps can be changed in many instances while having no effect on execution by the ECU.

At step 82 shown in FIG. 8, a timer is reset to ensure that the timer is ready to begin the trailer presence determination process and then the ECU advances to step 84. At step 84, the ECU sets a stored trailer length to 0 as a new trailer length determination has been authorized and the advances to step 86. At step 86, the ECU obtains the host vehicle speed from the ESC 30 or another device and then advances to step 88. At step 88, the ECU determines the velocity of reflection points from/to the sensor unit 22 and advances to step 90. At step 90, the ECU the ECU determines whether the speed or velocity of the reflection points are within a predetermined threshold of the speed of the host vehicle. In some embodiments, the predetermined threshold is about 3% of the host vehicle speed. Thus, the speed of the reflection points must be within the threshold that defines a range of about 3% greater or less than the host vehicle speed. The reflection points that are within the range are stored and the ECU advances to step 92.

At step 92, the ECU compares the yaw rate provided by the ESC with a predetermined yaw rate that corresponds a desired minimum trailer angle permitting sensing of the farthest edge of the trailer 44 in a curve. If the yaw rate is less than the predetermined minimum yaw rate, estimation cannot occur and the ECU advances to step 94. At step 94, the timer is reset and the ECU advances to step 86 and re-executes the steps.

When the yaw rate is greater than the predetermined minimum yaw rate at step 92, the ECU advances to step 95. At step 95, the ECU determines the presence of a side wall and the farthest reflection point 79 thereof. Thus, the distance from the left rear sensor unit 22 to the farthest edge of the trailer 44 is determined at the trailer angle shown in FIG. 7. This distance value, however, does not equal the length of the trailer. The ECU then advances to step 96.

At step 96 as shown in FIG. 8, the ECU 24 calculates an estimated trailer length. From the farthest reflection point 79, the ECU obtains a total distance value and a direction value. These values enable the ECU to obtain a distance value dx taken along the x-axis and a distance value dy taken along the y-axis corresponding to the farthest reflection point as shown in FIG. 7. The farthest reflection point 79 typically has the largest longitudinal distance value dx. With the two distance values dx, dy, and the angle determined from a yaw rate signal, the ECU applies the Pythagorean theorem to calculate an estimated trailer length. Then, the ECU advances to step 100.

At step 100 shown in FIG. 8, the ECU determines whether the estimated trailer length is greater than a previously stored trailer length. If the estimated trailer length is greater than the stored length, the ECU advances to step 102 whereat the trailer length value is stored by the ECU. After storing the trailer length value, the ECU advances to step 104. When the trailer length is not greater than a previously stored trailer length, the ECU advances directly to step 104.

At step 104, the timer is incremented. In some embodiments, the timer is a separate integrated circuit. In other embodiments, the timer is a clock component of the ECU or a similar device. After the timer is incremented, the ECU advances to step 106.

At step 106 shown in FIG. 8, the incremented timer value is compared to a stored predetermined time value. When the timer value is not greater than the predetermined time value, the ECU returns to step 86. At step 86, the ECU re-executes the steps discussed above. Upon returning to step 104, the timer is incremented. This process repeats until the timer value is greater than the predetermined time value at step 106. Then the ECI advances to step 108.

At step 108, the previously stored maximum trailer length is indicated and the steps shown in FIG. 8 are at least temporarily ended. The trailer length is provided to the human/machine display interface 32.

As in the trailer presence determination, the host vehicle and the trailer must move at a minimum vehicle speed for trailer length estimation to occur.

Figure 9:
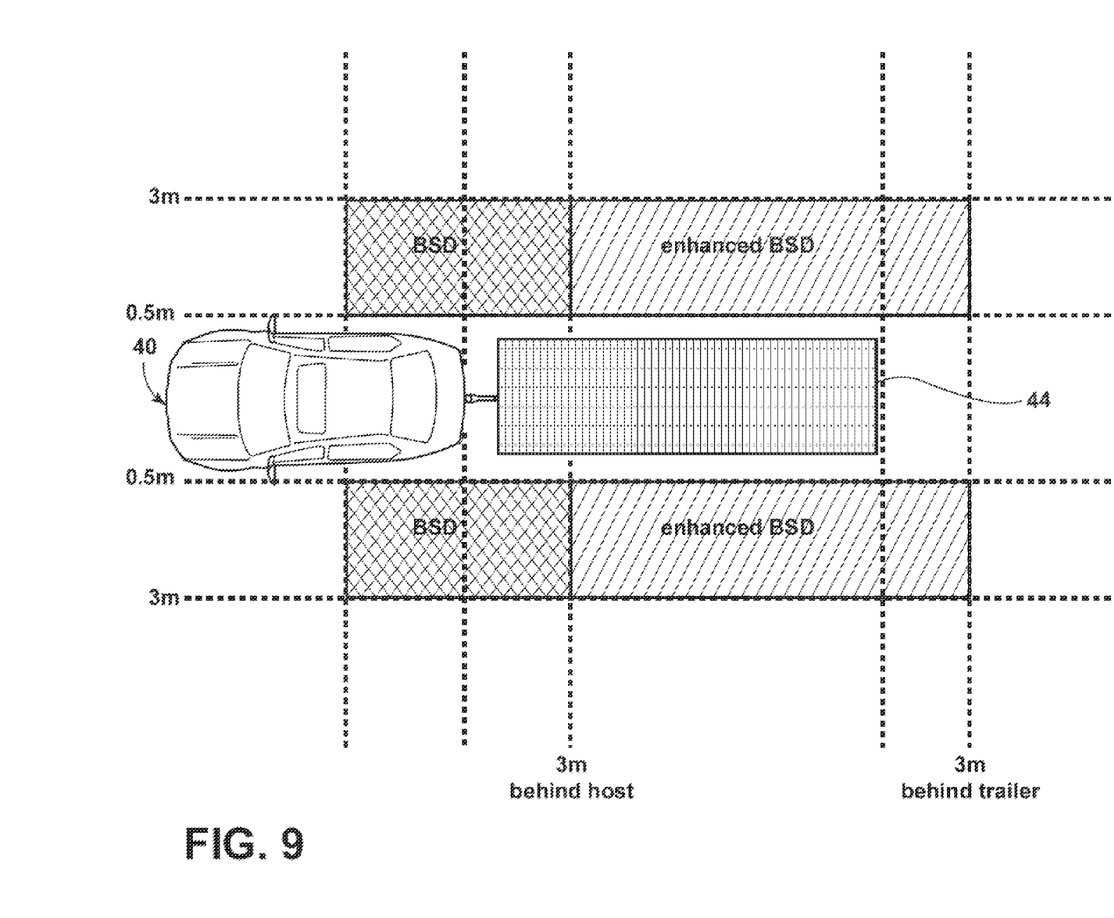
FIG. 9 is a top view show combined blind spot detection zones for a vehicle towing a trailer.

FIG. 9 shows the host vehicle 40 transporting a trailer 44 attached thereto. The ECU calculates an enhanced blind spot detection (BSD) zone based on the trailer length value, as shown in FIG. 9. At least two meters, and typically an additional three meters is added to the enhanced BSD zones on the sides and rearward of the trailer 44. The enhanced blind spot detection BSD zones are provided with the host vehicle blind spot detection zones (BSD) in FIG. 9 resulting in a combined blind spot detection zones located outwardly from a central part of the host vehicle and extending rearwardly, about three meters beyond the rear edge or end of the trailer.

In some embodiments, a host vehicle user has an option to enter a trailer length value via the human/machine display interface 32. Thus, when a user knows and enters the trailer length value, the routines in FIGS. 6 and 8 are not executed. Further, the user can manually deactivate the system utilizing the human/machine display interface 32.

Further, the human/machine display interface 32 provides optical and/or acoustic alarms and signals. In some embodiments, the human/machine display interface 32 includes a touch screen display menu, although voice recognition and other input arrangements are also contemplated. Some embodiments include haptic warnings and/or audio messages.

Besides blind spot detection zones, the above disclosed trailer detection presence and length arrangement can be utilized with a lane change assist (LCA). When looking with side mirrors of the host vehicle 40, objects typically are closer than they appear. Thus, the vehicle blind spot detection system 20 can be utilized to provide a lane change warning when an object or vehicle is in a BSD zone or an enhanced BSD zone shown in FIG. 9, especially when a turn signal is actuated for switching the host vehicle and trailer to an adjacent lane. The lane change warning is one or more of a visual and acoustic signal that is output from the human/machine display interface 32 or by a different device. Further, in some embodiments the system 20 assists a cross traffic alert (CTA) arrangement or a closing vehicle warning (CVW).

In some embodiments, the trailer detected signal and trailer length value are stored on an EEPROM of the sensor unit(s) 22, 28 provided with an ECU 24, 26. Thus, when a power cycle occurs (vehicle restart) the trailer detected signal and trailer length value are not recalculated. In other embodiments, upon a power cycle, trailer detection is determined. If no trailer is detected, the trailer detected signal and the trailer length value are cleared and reset to zero.

While a CAN bus is disclosed, any time of communication path is contemplated, such as FlexRay bus, or even an Ethernet connection.

Thus, the invention provides, among other things, an arrangement wherein blind spot detection zones are automatically extended beyond a rear of an attached trailer. Various features and advantages of the invention are set forth in the following claims.

What is claimed is:

1. A vehicle blind spot detection system for host vehicles with attached trailers comprising:
   at least two vehicle object rear sensor units located at a rear of a host vehicle, the sensor units disposed at opposing edges of the rear for detecting data regarding presence and location of objects relative to the host vehicle and motion information including moving direction and speed of objects relative to the host vehicle; and
   at least one electronic control unit in communication with one or both of the rear sensor units for processing the data acquired by the rear sensor units, wherein the electronic control unit is configured to:
      receive the data acquired by one or both of the rear sensor units, the acquired data including presence and location of objects with respect to a longitudinal axis and a transverse axis of the host vehicle, and the motion information from the rear sensor units;
      determine presence of a trailer when the motion information and the detected objects indicate the presence of a trailer attached to the rear of the host vehicle when the host vehicle and the trailer have same velocity;
      determine a length of the trailer when the presence of the trailer is indicated and the host vehicle is turning;
      provide an enhanced blind spot detection zone adjacent side walls of the trailer and extending rearward from the trailer an additional distance in response to the determined presence and the length of the trailer attached to the host vehicle, the host vehicle having a host vehicle blind spot detection zone to provide, in combination with the enhanced blind spot detection zone, a combined blind spot detection zone for the host vehicle and the trailer; and
      execute a blind spot detection to determine the presence of an object in the combined blind spot detection zone.

2. The system according to claim 1, comprising a human/machine display interface for notifying a vehicle operator whether changing a lane is available in response to the determination of the presence of an object in the combined blind spot detection zone of the host vehicle and the trailer.

3. The system of claim 1, wherein the electronic control unit is configured to automatically determine the length of an attached trailer by:
   sensing a distance and direction of a farthest reflection point of the trailer during turning of the host vehicle, the farthest reflection point being determined based on host vehicle velocity essentially matching a velocity from the reflection point and a reflection path of a signal transmitted by one of the rear sensor units to the farthest reflection point that has a farthest distance from the one rear sensor unit, the reflection path defining a longitudinal distance dx and a transverse distance dy for the farthest reflection point from the sensor unit, and wherein a plurality of reflection points define a side wall that includes the farthest reflection point of the trailer in the field-of-view of the rear sensor unit, and receiving a yaw rate from an electronic stability control, and when the yaw rate is greater than a predetermined yaw rate value, determining a trailer angle for the trailer based on the yaw rate, the trailer angle being relative to a longitudinal axis of the host vehicle, and executing a Pythagorean theorem to estimate trailer length based on distances dx, dy of the farthest reflection point and the trailer angle.

4. The system of claim 1, wherein the electronic control unit that is configured to automatically detect the presence, location and motion of any object within a field of view of the at least two vehicle object rear sensor units, is configured to sense vehicles driving on neighboring lanes or vehicles following the host vehicle.

5. The system of claim 1, wherein the enhanced blind spot detection zone extends at least two meters beyond a rear of the trailer attached to the host vehicle.

6. The system of claim 2, wherein the human-machine interface includes a warning unit for providing a vehicle operator with at least one warning selected from a group of: optical, acoustical and haptic warnings.

7. The system of claim 2, wherein the electronic control unit is configured for deactivation by the vehicle operator at any time by actuation of an input of the human/machine display interface.

8. The system of claim 2, wherein the human/machine display interface is capable of receiving a manually input trailer length value, the manual input the trailer length value overriding the length of the trailer determined by the electronic control unit.

9. The system of claim 1, wherein the rear sensor units comprise at least one selected from a group of: radar units, video camera units, LIDAR units and ultrasonic units.

10. A method for providing vehicle blind spot detection for host vehicles with trailers comprising:

obtaining data regarding location and presence of objects relative to a host vehicle and motion information including moving direction and speed of the objects relative to the host vehicle from at least one rear sensor unit;

processing the data acquired, including the detection of objects and their location and presence with respect to a longitudinal axis and a transverse axis of the host vehicle and motion information including moving direction and speed of objects;

determining presence of a trailer attached to the host vehicle when the motion information indicates that the detected object and the host vehicle have essentially the same speed and direction, while the location of the object is within a predetermined distance from the rear of the host vehicle;

determining a length of the trailer when the presence of the trailer is indicated and the host vehicle is turning;

determining the presence of an object in a combined blind spot detection zone of the host vehicle, wherein the combined blind spot detection zone comprises a blind spot detection zone of the host vehicle and an enhanced blind spot detection zone of the trailer that depends on the length of the trailer and extends rearward from the trailer a predetermined additional distance; and when a turn signal is actuated, notifying a vehicle operator when changing a lane whether a vehicle is in the intended lane.

11. The method of claim 10, including automatically detecting the presence, location and motion of an object within a field of view of the at least two rear vehicle object sensor units, including vehicles driving in the combined blind spot detection zone.

12. The method of claim 11, including the step of configuring an electronic control unit to perform blind spot detection and a lane change assist according to ISO Norm 17387.

13. The method of claim 10, wherein the predetermined additional distance of the enhanced blind spot detection zone is at least two meters beyond a bumper of the trailer attached to the host vehicle.

14. The method of claim 10, wherein the step of determining the length of an attached trailer comprises:

determining a farthest reflection point of the trailer by sensing a distance and a direction of the trailer from one of the rear sensor units, the farthest reflection point being determined based on host vehicle velocity essentially matching an object velocity and a reflection path of a signal transmitted by one of the rear sensor units to the farthest reflection point having a farthest distance from the one rear sensor unit, the reflection path defining a longitudinal distance dx and a transverse distance dy for the farthest reflection point from the sensor unit, and wherein a plurality of reflection points define a side wall that includes the farthest reflection point of the trailer in the field-of-view of the sensor unit; and receiving a yaw rate from an electronic stability control, and when the yaw rate is greater than a predetermined yaw rate value, determining a trailer angle for the trailer based on the yaw rate, the trailer angle being relative to a longitudinal axis of the host vehicle, and executing a Pythagorean theorem to estimate trailer length based on components dx, dy of the farthest reflection point and the trailer angle.

15. The method of claim 14, wherein the farthest reflection point has a greatest value for longitudinal distance dx.

16. A method for providing vehicle blind spot detection for host vehicles with trailers comprising:

obtaining data regarding location and presence of objects relative to a host vehicle, and motion information including moving direction and speed of the objects relative to the host vehicle from at least one rear sensor unit;

processing the data acquired, including the detection of objects and their location with respect to a longitudinal axis and a transverse axis of the host vehicle and motion information including moving direction and speed of objects;

determining presence of a trailer with the motion information indicating that the detected object and the host vehicle have essentially the same speed and direction, while the location of the object is within a predetermined distance of the host vehicle;

determining a length of the trailer when the presence of the trailer is indicated by sensing a farthest reflection point of the trailer from sensing a distance and a direction of the trailer from one of the rear sensor units, the farthest reflection point being determined based on host vehicle velocity essentially matching trailer velocity and a reflection path of a signal transmitted by the one rear sensor unit to the farthest reflection point having a farthest distance from the one rear sensor unit, and wherein a plurality of reflection points define a side wall that includes the farthest reflection point of the trailer in the field-of-view of the sensor unit, and receiving a yaw rate from an electronic stability control, and when the yaw rate is greater than a predetermined yaw rate value, determining a trailer angle for the trailer based on the yaw rate and the farthest reflection point, the trailer angle being relative to a longitudinal axis of the host vehicle;

determining an enhanced blind spot detection zone based on the length of the trailer, the enhanced blind spot detection zone extending rearward of a rear of the trailer a predetermined distance; and detecting presence of an object in a combined blind spot detection zone of the host vehicle, wherein the combined blind spot detection zone comprises a blind spot detection zone of the host vehicle and the enhanced blind spot detection zone of the trailer.

17. The method of claim 16, wherein the step of determining the length of the trailer further comprises the reflection path defining a longitudinal distance dx and a transverse distance dy for the farthest reflection point from the one rear sensor unit and executing a Pythagorean theorem to estimate trailer length based on distances dx, dy of the farthest reflection point and the trailer angle.

18. The method of claim 17, wherein the farthest reflection point has the greatest value for longitudinal distance dx.

19. The method of claim 17, including the step of, when a turn signal is actuated, notifying a vehicle operator whether a vehicle is in the combined blind spot detection zone of an intended lane for the host vehicle.

* * * * *